(12) United States Patent
Liu et al.

(10) Patent No.: US 11,268,724 B2
(45) Date of Patent: Mar. 8, 2022

(54) CONTROLLING METHOD OF AN INDOOR AIR ENVIRONMENT QUALITY COORDINATION AND CONTROL SYSTEM BASED ON MULTIPLE-PARAMETER EVALUATION

(71) Applicant: Chongqing University, Chongqing (CN)

(72) Inventors: Hong Liu, Chongqing (CN); Baizhan Li, Chongqing (CN); Wei Yu, Chongqing (CN); Runming Yao, Chongqing (CN); Yuxin Wu, Chongqing (CN); Lexiang Wang, Chongqing (CN); Nan Li, Chongqing (CN); Chenqiu Du, Chongqing (CN); Shaoxing Zhang, Chongqing (CN)

(73) Assignee: Chongqing University, Chongqing (CN)

( * ) Notice: Subject to any disclaimer, the term of this patent is extended or adjusted under 35 U.S.C. 154(b) by 9 days.

(21) Appl. No.: 16/985,386

(22) Filed: Aug. 5, 2020

(65) Prior Publication Data

US 2021/0041125 A1 Feb. 11, 2021

(30) Foreign Application Priority Data

Aug. 6, 2019 (CN) .......................... 201910722515.5

(51) Int. Cl.
*F24F 11/46* (2018.01)
*F24F 11/65* (2018.01)
(Continued)

(52) U.S. Cl.
CPC .............. *F24F 11/46* (2018.01); *F24F 11/65* (2018.01); *F24F 2110/10* (2018.01);
(Continued)

(58) Field of Classification Search
CPC .................................................. F24F 2110/64
See application file for complete search history.

(56) References Cited

U.S. PATENT DOCUMENTS 10,181,708 B2 * 1/2019 Roosli ..................... F24F 13/20
2014/0285114 A1 * 9/2014 Shen ................... G01N 33/0063
315/307

(Continued)

FOREIGN PATENT DOCUMENTS

CN      105972782 A    9/2016
CN      107560087 A    1/2018
(Continued)

OTHER PUBLICATIONS

First Office Action in counterpart Chinese Application No. 201910722515.5, dated Mar. 2, 2020.

*Primary Examiner* — Nathan L Laughlin
(74) *Attorney, Agent, or Firm* — Westbridge IP LLC (57) ABSTRACT

A controlling method of an indoor air environment quality cooperation and control system includes: sensing whether there is an indoor person; if not, turning off an air conditioner system and a purification system, judging the values monitored by an outdoor pollutant sensor and an indoor pollutant sensor, if the value monitored by the outdoor pollutant sensor is greater than that monitored by the indoor pollutant sensor, turning off a fresh air system, otherwise starting the fresh air system; if an indoor person is sensed, calculating an IAQI according to values transmitted by a temperature and humidity sensor and the indoor pollutant sensor; calculating a ratio R of a ΔIAQI and an energy consumption increase value ΔP, and selecting a regulation mode with the maximum ratio R to coordinate a quality of the indoor environment; and returning and executing the sensing step.

8 Claims, 2 Drawing Sheets

(51) Int. Cl.
  *F24F 110/20* (2018.01)
  *F24F 120/10* (2018.01)
  *F24F 110/70* (2018.01)
  *F24F 110/66* (2018.01)
  *F24F 110/10* (2018.01)
  *F24F 110/52* (2018.01)

(52) U.S. Cl.
  CPC ....... *F24F 2110/20* (2018.01); *F24F 2110/52* (2018.01); *F24F 2110/66* (2018.01); *F24F 2110/70* (2018.01); *F24F 2120/10* (2018.01)

(56) References Cited

U.S. PATENT DOCUMENTS

2016/0290673 A1* 10/2016 Park .......................... F24F 3/00
2021/0048206 A1* 2/2021 Forzani ................... F24F 11/30

FOREIGN PATENT DOCUMENTS

| CN | 108800367 A | 11/2018 |
| CN | 109946418 A | 6/2019 |
| KR | 20160112844 A | 9/2016 |

* cited by examiner

CONTROLLING METHOD OF AN INDOOR AIR ENVIRONMENT QUALITY COORDINATION AND CONTROL SYSTEM BASED ON MULTIPLE-PARAMETER EVALUATION

CROSS-REFERENCE TO RELATED APPLICATIONS

The present application claims the priority and benefits of Chinese Patent Application No. 201910722515.5 entitled "INDOOR AIR ENVIRONMENT QUALITY COORDINATION AND CONTROL SYSTEM AND METHOD BASED ON MULTIPLE-PARAMETER EVALUATION", which is filed on Aug. 6, 2019, and the entire disclosure of which is hereby incorporated by reference, in its entirety, for all that it teaches and for all purposes.

FIELD

The disclosure relates to the technical field of air quality detection, in particular to an indoor air environment quality coordination and control method based on multiple-parameter evaluation.

BACKGROUND

The traditional air quality detection method is costly in labor and complex in operation, the sensor technology of the indoor environment and the wide application of the information processing technology enable real-time monitoring of the air quality. However, the current indoor air quality monitoring control system only controls the single pollutant, such as the highest limit value of the 30 min average value of formaldehyde is 0.1 mg/m$^3$, the maximum high-concentration limit value of the 8 h average value of TVOC (volatile organics) is 06 mg/m$^3$, the average maximum limit value of PM2.5 concentration in air is 75 μg/m$^3$, or the daily average maximum limit value of the CO2 concentration is 1000 ppm, etc.; but in the actual buildings, there is not only one pollutant in the room, but also various pollutants coexisting, the indoor temperature and the humidity are diverse, and meanwhile, the system does not take into account whether there is a person in the room, so that certain energy waste is also present.

SUMMARY

Aiming at the defects of the prior art, the technical problem to be solved by the disclosure is: how to provide a multiple-parameter evaluation based indoor air environment quality coordination and control method capable of comprehensively considering indoor pollutants, indoor temperature and humidity states and whether there are people indoor, reducing energy waste on the premise that indoor environment quality requirements are met.

In order to solve the technical problem above, the present disclosure is adopting the following technical scheme:

An indoor air environment quality coordination and control system based on multiple-parameter evaluation includes an environment data monitoring system, a computer system connected with the environment data monitoring system, and an indoor air environment regulation and control system connected with the computer system for data transmission connection;

the environment data monitoring system includes infrared array sensors, a temperature and humidity sensor, an indoor pollutant sensor and an outdoor pollutant sensor.

the infrared array sensors are configured for sensing an indoor human body and transmitting the sensed value to the computer system;

the temperature and humidity sensor is configured for monitoring indoor temperature and humidity and transmitting the monitored values to the computer system;

the indoor pollutant sensor is configured for monitoring a concentration of indoor pollutants and transmitting monitored value to the computer system;

the outdoor pollutant sensor is configured for monitoring a concentration of outdoor pollutants and transmitting the monitored value to the computer system;

the indoor air environment coordination and control system includes an air condition system configured for adjusting indoor the temperature and humidity, a purification system and a fresh air system configured for regulating the concentration of indoor pollutants;

the computer system is configured for controlling the indoor air environment coordination and control system according to values transmitted by the environment data monitoring system.

An indoor air environment quality coordination and control method based on multiple-parameter evaluation includes the following steps:

step 1: sensing, by infrared array sensors, whether there is an indoor person or not, in determining that a person indoor is sensed, step 3 is executed; in determining that no person indoor is sensed, step 2 is executed;

step 2: turning off an air conditioner system and a purification system, and meanwhile, judging, by a computer system values monitored by an outdoor pollutant sensor and an indoor pollutant sensor. In determining that a value monitored by the outdoor pollutant sensor is greater than a value monitored by the indoor pollutant sensor, turning off the fresh air system, and in determining that the value monitored by the outdoor pollutant sensor is less than the value monitored by the indoor pollutant sensor, starting the fresh air system;

step 3: calculating, by the computer system, an indoor environment quality comprehensive evaluation index IAQI according to the values transmitted by the temperature and humidity sensor and the indoor pollutant sensor;

step 4: calculating, by the computer system, a ratio R of a reduction value of an indoor environment quality comprehensive evaluation index ΔIAQI and an energy consumption increase value ΔP, obtained in each of a plurality of different regulation modes, and selecting among the plurality of different regulation modes, by the computer system, a regulation mode with the maximum ratio R to coordinate a quality of the indoor environment;

step 5: returning and executing the step 1.

According to the scheme, whether a person is indoor or not is firstly sensed by the infrared array sensor. When there is no person sensed indoor, turning off the air conditioner system and the purification system, and determining whether the fresh air system is opened or closed according to the concentration of the indoor pollutants and the outdoor pollutants, so that preventing the energy waste generated by a continuously-working air condition system and the purification system when there is no person indoor; and meanwhile, the indoor can keep good air quality all the time through the fresh air system, and outdoor pollutants cannot be introduced into the room when the outdoor pollution is serious.

When there is a person indoor, the indoor temperature and humidity and pollutant concentration are monitored by using a temperature and humidity sensor and an indoor pollutant sensor, a computer system calculates an indoor environment quality comprehensive evaluation index IAQI according to the monitoring data. Then the computer system calculates the ratio R of the reduce value of the indoor environment quality comprehensive evaluation index ΔIAQI and the increase value of the energy waste ΔP in each of the different regulation modes. The indoor environment quality is coordinated and controlled in a regulation mode with a maximum ratio R, so that when the decrease value of the indoor environment quality comprehensive index ΔIAQI is invariant, to coordinate and control the indoor environment quality by selecting the minimum increase value of energy consumption, so that the waste of energy is reduced to the maximum extent on the premise that the indoor environment quality requirement is met.

The present disclosure has the beneficial effects that the present disclosure comprehensively considers the space-time distribution characteristics of the human body behavior characteristics, indoor pollutants and the temperature and humidity environment parameters. Based on the molecular biology experiment knowledge, the indoor environment quality comprehensive evaluation index IAQI obtained by comprehensive factors of the hot-wet environment and the indoor pollutants is proposed, and the indoor environment quality is coordinated and controlled in the most economical and energy-saving regulation and control manner, so that the energy consumption is reduced to the maximum extent on the premise that the indoor environment quality requirement is met.

In an embodiment, the indoor environment quality comprehensive evaluation index IAQI in step 3 is calculated according to the following formula:

$$IAQI = \Sigma_i^n IQAI_i; \quad IAQI_i = \frac{IAQI_{Hi} - IAQI_{Li}}{BP_{Hi} - BP_{Li}}(C_i - BP_{Li}) + IAQI_{Li};$$

In the formula, $IAQI_i$ is an indoor environment quality sub-index of pollutant i; n is a number of pollutant items; $C_i$ is a monitored value of a concentration of pollutant i; $Bp_{Hi}$ is a high-level value of a concentration limit of the pollutant i close to Ci; $Bp_{Li}$ is a low-level value of a concentration limit of the pollutant i close to Ci; $IAQI_{Hi}$ is an indoor environment quality sub-index corresponding to $BP_{Hi}$; $IAQI_{Li}$ is an indoor environment quality index corresponding to the $BP_{Li}$.

In this way, the indoor environment quality comprehensive evaluation index IAQI can be specifically obtained according to the monitored values of the concentration of indoor pollutants, the values of $BP_{Hi}$, $BP_{Li}$, $IAQI_{Hi}$, $IAQI_{Li}$ are selected according to the following Table 1.

In Table 1, the thermal sensation absolute value 1 represents slightly cool or slightly warm, 2 represents cool or warm, 3 represents cold or heat, and the calculation method refers to GB/T 50785-2012 "Civil Building Indoor Thermal Humidity Environment Evaluation Standard".

In an embodiment, the plurality of different regulation modes in step 4 includes:

regulating and controlling the air condition system to change the indoor temperature and humidity, and operating the purification system and the fresh air system according to a single control parameter;

regulating and controlling the purification system to purify the concentrations of the indoor pollutants, operating the air condition system to meet a thermal comfort requirement, and operating the fresh air system according to the single control parameter; and regulating and controlling the fresh air system to reduce the concentrations of indoor pollutants, operating the air condition system to meet the thermal comfort requirement, and operating the purification system according to the single control parameter.

In this way, different regulation modes are arranged, the ratio R of the reduction value ΔIAQI and the energy consumption increase value ΔP of the indoor environment quality comprehensive evaluation index realized by different regulation modes is calculated, and the maximum ratio R is selected for regulation and control, so that the energy waste is reduced to the maximum extent on the premise that the indoor environment quality requirement of indoor people is met.

In an embodiment, in the step 4, the regulation mode of regulating and controlling the air condition system to change indoor temperature and humidity, and operating the purification system and the fresh air system according to a single control parameter is adopted, $$R_1 = \frac{\Delta IAQI_1}{\Delta P_1} = \frac{IAQI_1 - IAQI_2}{\Delta P_1}; \Delta P_1 = \frac{(T1 - T2)}{COP} * 100 * A;$$

In the formula, T1 is an indoor air temperature before regulation and control of the air condition system; T2 is an indoor air temperature after regulation and control of the air condition system; A is an outer wall area; COP is an air conditioner efficiency ratio; $IAQI_1$ is an indoor environment quality comprehensive evaluation index when the indoor temperature is T1; $IAQI_2$ is an indoor environment quality comprehensive evaluation index when the indoor temperature is T2.

In this way, through calculation, a ratio of a reduction value of the indoor environment quality comprehensive evaluation index to an increase value of energy consumption is provided as a basis for selection of the regulation mode when the regulation mode of using regulation and control air

TABLE 1

Indoor air quality sub-index and corresponding concentration limit value

| Indoor Air Quality Sub-index | Formaldehyde (μg/m³) | TVOC (μg/m³) | PM2.5 (μg/m³) | CO2 (ppm) | Relative Humidity and Absolute Value with 50% Value Difference (%) | Thermal Sensation Absolute Value |
|---|---|---|---|---|---|---|
| 0 | 30 | 200 | 0 | 500 | 10 | 1 |
| 50 | 80 | 400 | 35 | 800 | 30 | 2 |
| 100 | 100 | 600 | 75 | 1000 | 50 | 3 | condition system to change indoor temperature and humidity, and operating the purification system and the fresh air system according to a single control parameter is adopted.

In an embodiment, in the step 4, the regulation mode of regulating and controlling purification system to purify the concentrations of the indoor pollutants, operating the air condition system to meet the thermal comfort requirement, and operating the fresh air system according to a single control parameter is adopted, $$R_2 = \frac{\Delta IAQI_2}{\Delta P_2} = \frac{IAQI_3 - IAQI_4}{\Delta P_2}, \Delta P_2 = P2 - P1;$$

$$C2_i = C1_i - \eta * \frac{(Q4 - Q3)}{V} * C1_i;$$

$$IAQI_3 = \Sigma_i^n IQAI_i, IAQI_i = \frac{IAQI_{Hi} - IAQI_{Li}}{BP_{Hi} - BP_{Li}}(C1_i - BP_{Li}) + IAQI_{Li};$$

$$IAQI_4 = \Sigma_i^n IQAI_i, IAQI_i = \frac{IAQI_{Hi} - IAQI_{Li}}{BP_{Hi} - BP_{Li}}(C2_i - BP_{Li}) + IAQI_{Li};$$

In the formulas, Q3 is an amount of purified air before regulation; Q4 is an amount of purified air after regulation; P1 is a power of the purification system before the regulation and control; P2 is a power of the purification system after the regulation and control; $C1_i$ is a concentration of the pollutant i before regulation and control of the purification system; $C2_i$ is a concentration of the pollutant i after regulation and control of the purification system; η is a purification efficiency of the purification system; V is a room volume; $IAQI_3$ is a comprehensive evaluation index of indoor environment quality before regulation and control of the purification system; $IAQI_4$ is a comprehensive evaluation index of indoor environment quality after regulation and control of the purification system.

In this way, through calculation, in the regulation mode of regulating and controlling purification system to purify the concentrations of the indoor pollutants, operating the air condition system to meet the thermal comfort requirement, and operating the fresh air system according to a single control parameter is adopted, the ratio of the reduction value of the indoor environment quality comprehensive evaluation index to the increase value of the energy consumption is obtained, which is a basis for selection of the regulation mode.

In an embodiment, in step 4, the regulation mode of regulating and controlling the fresh air system to reduce the concentrations of the indoor pollutants, operating the air condition system to meet the thermal comfort requirement, and operating the purification system according to a single control parameter is adopted, $$R_3 = \frac{\Delta IAQI_3}{\Delta P_3} = \frac{IAQI_5 - IAQI_6}{\Delta P_3}, \Delta P_3 = \frac{(T4 - T3)}{COP_2} * (Q2 - Q1);$$

$$C6_i = C5_i - \frac{(Q2 - Q1)}{V} * (C4_i - C3_i);$$

$$IAQI_5 = \Sigma_i^n IQAI_i, IAQI_i = \frac{IAQI_{Hi} - IAQI_{Li}}{BP_{Hi} - BP_{Li}}(C5_i - BP_{Li}) + IAQI_{Li};$$

$$IAQI_6 = \Sigma_i^n IQAI_i, IAQI_i = \frac{IAQI_{Hi} - IAQI_{Li}}{BP_{Hi} - BP_{Li}}(C6_i - BP_{Li}) + IAQI_{Li};$$

In the formulas, Q1 is a fresh air volume before regulation; Q2 is a fresh air volume after regulation; T3 is a temperature of an air inlet of the fresh air system; T4 is a temperature of an air outlet of the fresh air system; $C3_i$ is a concentration of an air inlet pollutant i of the fresh air system; $C4_i$ is a concentration of a pollutant i at an air outlet of the fresh air system; $C5_i$ is a concentration of the pollutant i before regulation and control of the fresh air system; $C6_i$ is a concentration of the pollutant i after regulation and control of the fresh air system; $COP_2$ is an energy efficiency ratio of the fresh air system; $IAQI_5$ is configured for regulating the indoor environment quality comprehensive evaluation index before the regulation and control of the fresh air system; $IAQI_6$ is an indoor environment quality comprehensive evaluation index after the regulation and control of the fresh air system.

In this way, through calculation, in the regulation mode of regulating and controlling the fresh air system to reduce the concentrations of the indoor pollutants, operating the air condition system to meet the thermal comfort requirement, and operating the purification system according to a single control parameter, the ratio of the reduction of the indoor environment quality comprehensive evaluation index to the energy consumption increase value is obtained, providing a basis for selection between the regulation modes.

In an embodiment, the indoor pollutant sensor comprises one or more of a formaldehyde concentration sensor, a volatile organics sensor, a PM2.5 detection sensor, and a $CO_2$ concentration sensor.

In the step 3, the set value of the concentration of indoor pollutants is required to be as follows: a set value of formaldehyde concentration being 0.1 mg/m³, a set value of volatile organics being 0.6 mg/m³, a set value of PM2.5 concentration being 75 μg/m³, a set value of $CO_2$ concentration being 1000 ppm; in determining that any of monitored values of the formaldehyde sensor, volatile organics sensor, PM2.5 detection sensor and $CO_2$ concentration sensor is greater than the corresponding set value, the concentration of the pollutants that the indoor pollutant sensor detects is determined to be greater than the set value and the purification system is started.

In determining that the temperature and humidity sensor detects that the indoor temperature is higher than 28° C., the air condition system is started.

In determining that the values monitored by the outdoor pollutant sensor is greater than the values monitored by the indoor pollutant sensor, the fresh air system is turned off, and in determining that the values monitored by the outdoor pollutant sensor is smaller than the values monitored by the indoor pollutant sensor, the fresh air system is started.

Therefore, when the indoor temperature is greater than 28° C., the air condition system is started, to prevent indoor people feeling overheated; when the indoor pollutant sensor monitors that any pollutant concentration exceeds a set value, the purification system is started, reducing the damage to the health of the indoor people caused by exceeded pollutant concentration; meanwhile, the indoor unit can keep having good air quality all the time through the fresh air system, and outdoor pollutants cannot be introduced into the room when the outdoor pollution is serious.

In determining that the indoor environment quality comprehensive evaluation index IAQI is not less than 0 and not greater than 50, the air quality is determined to be optimal and is represented by a green identifier.

In determining that the indoor environment quality comprehensive evaluation index IAQI is not less than 0 and not greater than 50, the air quality is determined to be optimal and is represented by a green identifier.

In determining that the indoor environment quality comprehensive evaluation index IAQI is not less than 51 and not greater than 100, the air quality is determined to be good and is represented by a yellow identifier.

In determining that the indoor environment quality comprehensive evaluation index IAQI is not less than 101 and not greater than 200, the air quality is determined to be light pollution and is represented by an orange identifier.

In determining that the indoor environment quality comprehensive evaluation index IAQI is not less than 201 and not greater than 300, the air quality is determined to be moderate pollution and is represented by a red identifier.

In determining that the indoor environment quality comprehensive evaluation index IAQI is greater than 500, the air quality is determined to be severe pollution and is represented by a brown identifier.

In this way, the numerical ranges of the different indoor environment quality comprehensive evaluation index IAQI is corresponding to different color identifiers, so that the current indoor environment quality condition can be known clearly through the color identifiers.

In an embodiment, when the indoor environment quality comprehensive evaluation index IAQI is not greater than 100, the indoor environment health rating is optimal or good at the user terminal; and when the indoor environment quality comprehensive evaluation index IAQI is greater than 100, values monitored by the indoor pollutant sensor and the temperature and humidity sensor are prompted to exceed the standards of the pollutants and/or the hot wet environmental factor is high or low.

In this way, through the user terminal, according to the indoor environment quality comprehensive evaluation index IAQI, indoor environment conditions are displayed, when the indoor environment quality comprehensive evaluation index IAQI is not greater than 100, the indoor environment health rating in the user terminal is optimal or good, indoor people can implement indoor activities safely, and when the indoor environment quality comprehensive evaluation index IAQI is greater than 100, the indoor environment quality comprehensive evaluation index IAQI is greater than 100, then the user terminal notifies that the values of pollutant i monitored according to the indoor pollutant sensor and the temperature and humidity sensor exceeds the standard, in this way, the indoor people can clearly see the problem of the indoor environment quality, defecting the existing shortage of the current warning system and device, improving the technological level of the whole air quality operation system chain, driving the development of the environment health industry, and reducing the health risk of human body and the social medical burden.

BRIEF DESCRIPTION OF THE DRAWINGS

In order to make the purpose, technical solutions and advantages of the present disclosure more clear, the present disclosure will be described in further detail with reference to the accompanying drawings.

DETAILED DESCRIPTION OF THE EMBODIMENTS

Further detailed description of the present disclosure is provided below in conjunction with the accompanying drawings.

Figure 1:
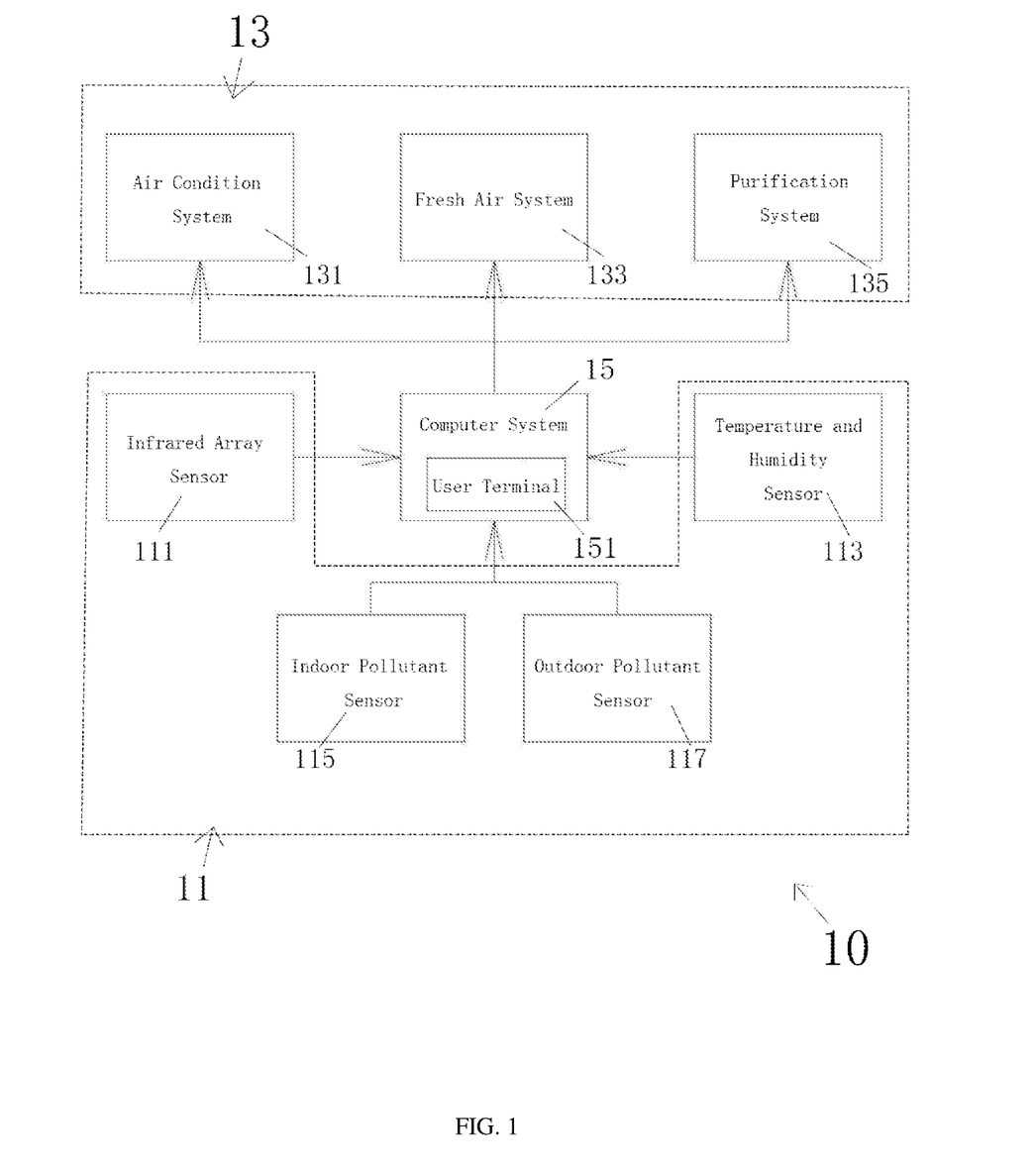
FIG. 1 is a schematic system diagram of an indoor air environment quality coordination and control system based on multiple-parameter evaluation according to a specific embodiment of the present disclosure.

As shown in FIG. 1, the indoor air environment quality coordination and control system based on multiple-parameter evaluation 10 includes an environment data monitoring system 11, an indoor air environment regulation and control system 13, and a computer system 15 connected with the environment data monitoring system 11 and the indoor air environment regulation and control system 13 for data transmission therewith.

The environment data monitoring system 11 includes infrared array sensors 111 which include at least an array of infrared sensors, a temperature and humidity sensor 113, an indoor pollutant sensor 115 and an outdoor pollutant sensor 117.

The infrared array sensors are configured for sensing an indoor human body and transmitting sensed value to the computer system.

The temperature and humidity sensor is configured for monitoring an indoor temperature and an indoor humidity and transmitting monitored values to the computer system.

The indoor pollutant sensor is configured for monitoring concentrations of pollutants in a room and transmitting monitored values to the computer system.

The outdoor pollutant sensor is configured for monitoring concentrations of outdoor pollutants and transmitting monitored values to the computer system.

The indoor air environment regulation and control system includes an air condition system configured for adjusting the indoor temperature and humidity, a purification system and a fresh air system, where the purification system and the fresh air system are configured for regulating the concentration of indoor pollutants.

The computer system controls the indoor air environment regulation and control system according to the data transmitted from the environment data monitoring system.

In this embodiment, the computer system further includes a user terminal, the user terminal is configured for displaying the data transmitted from the environment data monitoring system and operation information of the indoor air environment regulation and control system.

In this way, the monitoring people can master relevant data information of various pollutant concentrations, temperature and humidity in the current room in real time through the user terminal, and meanwhile, the specific working condition of the indoor air environment regulation and control system can be intuitively known.

In this embodiment, an operation interface is further provided at the user terminal, data can be manually input on the operation interface to manually regulate and control the air condition system, the purification system and the fresh air system.

In this way, the monitoring people can regulate and control the air condition system, the purification system and the fresh air system by manually inputting data on the operation interface, so as to better meet the personalized requirements of indoor people on the air quality.

In this embodiment, the error of the infrared array sensors is less than 2.5° C.

In this way, the infrared array sensors can accurately detect whether a person exists indoors, and false judgment caused by inaccurate detection precision is avoided.

In this embodiment, the environment data monitoring system is connected with the computer system in a wireless manner.

In this way, the position arrangement between the computer system and the environmental data detection system is more flexible by means of wireless connection.

Of course, the environment data monitoring system can also be connected to the computer system via a data line.

In this way, data detected by the environment data monitoring system can be transferred to the computer system more quickly and stably.

Figure 2:
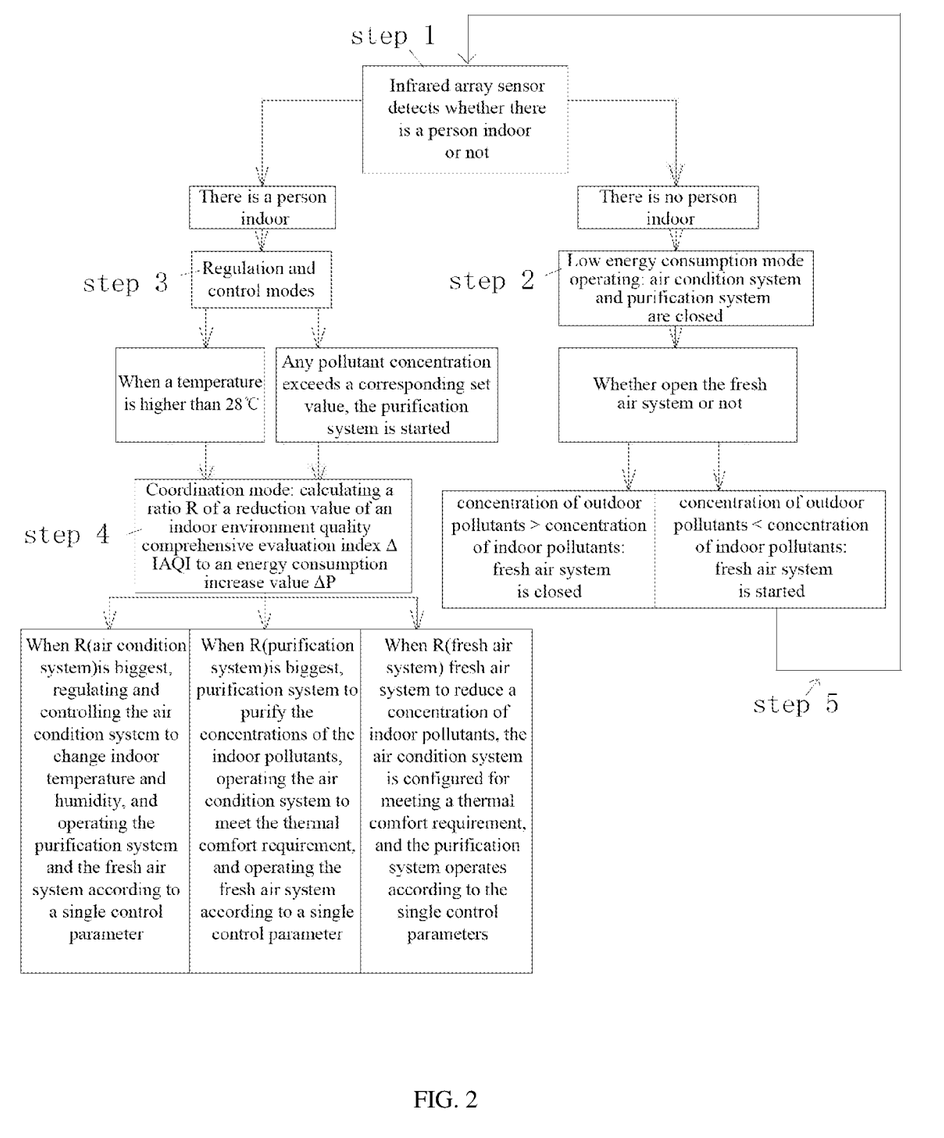
FIG. 2 is a schematic control flow diagram of an indoor air environment quality coordination and control method based on multiple-parameter evaluation according to a specific embodiment of the present disclosure.

As shown in FIG. 2, the indoor air environment quality coordination and control method based on multiple-parameter evaluation includes the following steps:

step 1, sensing whether there is an indoor person using infrared array sensors; in determining that the infrared array sensors sense an indoor person, executing the step 3; in determining that the infrared array sensors sense no person indoor, executing step 2;

step 2, turning off the air condition system and the purification system; meanwhile, judging, by a computer system, values monitored by an outdoor pollutant sensor and value monitored by an indoor pollutant sensor, in determining that a value monitored by the outdoor pollutant sensor is greater than a value monitored by the indoor pollutant sensor, turning off the fresh air system, in determining that the value monitored by the outdoor pollutant sensor is less than the value monitored by the indoor pollutant sensor, starting the fresh air system, and then executing step 5;

step 3, calculating by the computer system, indoor environment quality comprehensive evaluation indexes IAQI according to value transmitted by a temperature and humidity sensor and the indoor pollutant sensor;

step 4, calculating a ratio R of a reduction value of the indoor environment quality comprehensive index ΔIAQI to an increase value of the energy consumption ΔP obtained in each of a plurality of different regulation modes, and regulating the indoor environment quality using a regulation mode with the maximum ratio R;

step 5, returning to execute step 1.

The present disclosure firstly senses whether there is a person indoor by using infrared array sensors. When in determining that there is no person indoor sensed, the air conditioner system and the purification system are closed, and the fresh air system is opened or closed according to the concentration of the indoor pollutants and the concentration of the outdoor pollutants, so that energy waste generated by the continuous operation of the air condition system and the purification system in the room is avoided, and meanwhile, the indoor can keep good air quality all the time through the fresh air system, and outdoor pollutants cannot be introduced into the room when the outdoor pollution is serious. Pollution release may exist due to indoor furniture decoration, which needs to be discharged in time. When the person is not in the room and the air conditioner is closed, ventilation is more energy-saving, which is equivalent to pre-ventilation, so that when people enter the room, the indoor pollution is not greater than the outdoor, reduce the situation that people have bad feeling about the air as soon as entering the room. If the air is refreshed after the person get in, the process takes longer time, and the pollution does not drop down immediately, people have been uncomfortable inside the room, such as night ventilation at the office, the ventilation effect and the energy saving effect of which is better than refreshing the air after the present of the person.

When there is a person indoor, indoor temperature and humidity and pollutant concentrations are monitored by using a temperature and humidity sensor and an indoor pollutant sensor, a ratio R of a reduction value of the indoor environment quality comprehensive index ΔIAQI to an increase value of the energy consumption ΔP in each of different regulation modes is calculated. The regulation mode with the maximum ratio is selected to regulate the indoor environment quality, that is, the indoor environment quality is regulated by selecting the regulation mode with the minimum energy consumption increase value under the condition that the indoor environment quality comprehensive evaluation index ΔIAQI is constant, so that the energy waste is reduced to the maximum extent on the premise that the indoor environment quality requirement of the indoor people is met.

The beneficial effects of the invention are as follows:

The present disclosure comprehensively considers the space-time distribution characteristics of the human behavior characteristics, the indoor pollutants and the temperature and humidity environment parameters, based on the molecular biology experiment knowledge, the indoor environment quality comprehensive evaluation index IAQI obtained by comprehensive factors of the hot-wet environment and the indoor pollutants is proposed, and the indoor environment quality is regulated and controlled in the most economical and energy-saving regulation and control manner, so that the energy waste is reduced to the maximum extent on the premise that the indoor environment quality requirement is met for the indoor people.

In the embodiment, the indoor environment quality comprehensive evaluation index IAQI in step 3 is calculated according to the following method:

$$IAQI = \Sigma_i^n IQAI_i; \quad IAQI_i = \frac{IAQI_{Hi} - IAQI_{Li}}{BP_{Hi} - BP_{Li}}(C_i - BP_{Li}) + IAQI_{Li}$$

In the formula, $IAQI_i$ is an indoor environment quality sub-index of pollutant i; N is a number of pollutant items; $C_i$ is a monitored value of a concentration of pollutant i; $BP_{Hi}$ is a high-level value of a concentration limit of the pollutant i close to Ci; $BP_{Li}$ is a low-level value of a concentration limit of the pollutant i close to Ci; $IAQI_{Hi}$ is an indoor environment quality sub-index corresponding to $BP_{Hi}$; $IAQI_{Li}$ is an indoor environment quality sub-index corresponding to a $BP_{Li}$.

In this way, the indoor environment quality comprehensive evaluation index IAQI can be specifically obtained according to the monitored value of concentration of indoor pollutants, $BP_{Hi}$, $BP_{Li}$, $IAQI_{Hi}$ and $IAQI_{Li}$ are selected according to the following table 1.

TABLE 1

Indoor air quality sub-index and corresponding concentration limit thereof

| Indoor Air Quality Sub-index | Formaldehyde ($\mu g/m^3$) | TVOC ($\mu g/m^3$) | PM2.5 ($\mu g/m^3$) | CO2 (ppm) | Relative Humidity and Absolute Value with 50% Value Difference (%) | Thermal Sensation Absolute Value |
|---|---|---|---|---|---|---|
| 0 | 30 | 200 | 0 | 500 | 10 | 1 |
| 50 | 80 | 400 | 35 | 800 | 30 | 2 |
| 100 | 100 | 600 | 75 | 1000 | 50 | 3 |

In Table 1, the thermal sensation absolute values 1 represents slightly cool or slightly warm, 2 represents cool or warm, and 3 represents cold or heat, and the calculation method refers to GB/T 50785-2012 "Civil Building Indoor Thermal Humidity Environment Evaluation Standard".

In this embodiment, the regulation modes in step 4 includes:

regulating and controlling the air condition system to change the indoor temperature and humidity, and operating the purification system and the fresh air system according to their respective single control parameters;

regulating and controlling the purification system to purify the concentrations of the indoor pollutants, operating the air condition system to meet a thermal comfort requirement, and operating the fresh air system according to the single control parameter;

regulating and controlling the fresh air system to reduce the concentrations of the indoor pollutants, operating the air condition system to meet the thermal comfort requirement, and operating the purification system according to the single control parameter.

In this embodiment, setting different regulation modes, through calculating the ratio R of the reduction value of the indoor environment quality comprehensive evaluation index $\Delta IAQI$ to the increase value of energy consumption $\Delta P$ in each of the different regulation modes, selecting the regulation mode with the maximum ratio R, in order to reduce the energy consumption to the maximum extent on the premise that the requirement of the indoor environment quality for the indoor people is met.

In this embodiment, when in step 4 the regulation mode of regulating and controlling the air condition system to change indoor temperature and humidity, and operating the purification system and the fresh air system according to a single control parameter is adopted, $$R_1 = \frac{\Delta IAQI_1}{\Delta P_1} = \frac{IAQI_1 - IAQI_2}{\Delta P_1}; \Delta P_1 = \frac{(T1-T2)}{COP}*100*A;$$

In the formula, T1 is an indoor air temperature before regulation and control of the air condition system; T2 is an indoor air temperature after regulation and control of the air condition system; A is an outer wall area; COP is the energy efficiency ratio of the air conditioner; $IAQI_1$ is an indoor environment quality comprehensive evaluation index when the indoor temperature is T1; $IAQI_2$ is an indoor environment quality comprehensive evaluation index when the indoor temperature is T2.

In this way, through calculation, in the regulation mode of regulating and controlling the air condition system to change indoor temperature and humidity, and operating the purification system and the fresh air system according to a single control parameter, a ratio R of the reduction value of the indoor environment quality comprehensive evaluation index $\Delta IAQI$ to the energy consumption increase value $\Delta P$ is obtained, providing basis for selection between the regulation modes.

In this embodiment, when in step 4, the regulation mode of regulating and controlling purification system to purify the concentrations of the indoor pollutants, operating the air condition system to meet the thermal comfort requirement, and operating the fresh air system according to a single control parameter is adopted, $$R_2 = \frac{\Delta IAQI_2}{\Delta P_2} = \frac{IAQI_3 - IAQI_4}{\Delta P_2}, \Delta P_2 = P2 - P1;$$

$$C2_i = C1_i - \frac{(Q4-Q3)}{V}*C1_i;$$

$$IAQI_3 = \Sigma_i^n IQAI_i, IAQI_i = \frac{IAQI_{Hi} - IAQI_{Li}}{BP_{Hi} - BP_{Li}}(C1_i - BP_{Li}) + IAQI_{Li};$$

$$IAQI_4 = \Sigma_i^n IQAI_i, IAQI_i = \frac{IAQI_{Hi} - IAQI_{Li}}{BP_{Hi} - BP_{Li}}(C2_i - BP_{Li}) + IAQI_{Li};$$

In the formulas, Q3 is an amount of purified air before regulation and control; Q4 is an amount of purified air after regulation and control; P1 is a power of the purification system before regulation and control; P2 is a power of the purification system after regulation and control; $C1_i$ is a concentration of the pollutant i before the regulation and control of the purification system; $C2_i$ is a concentration of the pollutant i after the regulation and control of the purification system; η is a purification efficiency of the purification system; V is a room volume. $IAQI_3$ is an indoor environment quality comprehensive evaluation index before regulation and control of the purification system; $IAQI_4$ is an indoor environment quality comprehensive evaluation index after regulation and control of the purification system.

In this way, through calculation, in the regulation mode of regulating and controlling purification system to purify the concentrations of the indoor pollutants, operating the air condition system to meet the thermal comfort requirement, and operating the fresh air system according to a single control parameter, a ratio R of the reduction value of the indoor environment quality comprehensive evaluation index $\Delta IAQI$ to the energy consumption increase value $\Delta P$ is obtained, providing basis for selection between the regulation modes.

In this embodiment, when in step 4, the regulation mode of regulating and controlling the fresh air system to reduce the concentrations of the indoor pollutants, operating the air condition system to meet the thermal comfort requirement, and operating the purification system according to a single control parameter is adopted, $$R_3 = \frac{\Delta IAQI_3}{\Delta P_3} = \frac{IAQI_5 - IAQI_6}{\Delta P_3}, \Delta P_3 = \frac{(T4-T3)}{COP_2}*(Q2-Q1);$$

$$C6_i = C5_i - \frac{(Q2-Q1)}{V}*(C4_i - C3_i);$$

$$IAQI_5 = \Sigma_i^n IQAI_i, IAQI_i = \frac{IAQI_{Hi} - IAQI_{Li}}{BP_{Hi} - BP_{Li}}(C5_i - BP_{Li}) + IAQI_{Li};$$

$$IAQI_6 = \Sigma_i^n IQAI_i, IAQI_i = \frac{IAQI_{Hi} - IAQI_{Li}}{BP_{Hi} - BP_{Li}}(C6_i - BP_{Li}) + IAQI_{Li};$$

In the formulas, Q1 is a fresh air amount before regulation and control; Q2 is a fresh air amount after regulation and control; T3 is a temperature of the inlet of the fresh air system; T4 is a temperature of the outlet of the fresh air system; $C3_i$ is a concentration of the pollutant i at the inlet of the fresh air system; $C4_i$ is a concentration of the pollutant i at the outlet of the fresh air system; $C5_i$ is a concentration of the pollutant i before the regulation and control of the fresh air system; $C6_i$ is a concentration of the pollutant i after the regulation and control of the fresh air system; $COP_2$ is an efficiency ratio of the fresh air system; $IAQI_5$ is an indoor environment quality comprehensive evaluation index before the regulation and control of the fresh air system; $IAQI_5$ is an indoor environment quality comprehensive evaluation index after the regulation and control of the fresh air system.

In this way, through calculation, in the regulation mode of regulating and controlling the fresh air system to reduce the concentrations of the indoor pollutants, operating the air condition system to meet the thermal comfort requirement, and operating the purification system according to a single control parameter, the ratio of the reduction of the indoor environment quality comprehensive evaluation index to the energy consumption increase value is obtained, providing a basis for selection between the regulation modes.

In this embodiment, the indoor pollutant sensor includes one or more of a formaldehyde concentration sensor, a volatile organics sensor, a PM2.5 detection sensor, and a $CO_2$ concentration sensor.

In step 3, a set value of a concentration of the indoor pollutants include: a set value of formaldehyde concentration being 0.1 mg/m³, a set value of the volatile organics being 0.6 mg/m³, a set value of a PM2.5 concentration being 75 µg/m³, a set value of a $CO_2$ concentration being 1000 ppm. When any of the monitored values of the formaldehyde sensor, the volatile organics sensor, the PM2.5 detection sensor and the $CO_2$ concentration sensor of the indoor pollutant sensor is greater than the corresponding set value, the concentration of the pollutants that the indoor pollutant sensor detects is determined to be greater than the set value and the purification system is started. The indoor pollutant sensors detect the concentrations of these normal pollutants, and transmits the values detected to the computer system, the computer system then regulates and controls the indoor air environment regulation and control system, so that when the concentrations of these pollutants exceed the standard values, the computer system can reduce the concentrations of these pollutants through the regulation and control of the indoor air environment regulation and control system in time, in order to bring the concentrations of the pollutants down below the standard values, preventing exceeded concentrations of the pollutants to do damage to the indoor people.

In determining that the temperature and humidity sensor detects that the indoor temperature is higher than 28° C., the air condition system is started.

In determining that the values monitored by the outdoor pollutant sensor is greater than the values monitored by the indoor pollutant sensor, the fresh air system is turned off, and in determining that the values monitored by the outdoor pollutant sensor is less than the values monitored by the indoor pollutant sensor, the fresh air system is started.

In this way, when the indoor temperature is greater than 28° C., the air condition system is started, preventing the indoor people to feel overheated, when the indoor pollutant sensor monitors that any pollutant concentration exceeds a corresponding set value, the purification system is started, so that reducing the damage to health of the indoor people, meanwhile, the indoor unit can keep good air quality all the time through the fresh air system, and preventing the outdoor pollutants to be introduced into the room when the outdoor pollution is serious.

In the embodiment, in determining that the indoor environment quality comprehensive evaluation index IAQI is not less than 0 and not greater than 50, the air quality is determined to be optimal and is represented by a green identifier; in determining that the indoor environment quality comprehensive evaluation index IAQI is not less than 51 and not greater than 100, the air quality is determined to be good and is represented by a yellow identifier; in determining that the indoor environment quality comprehensive evaluation index IAQI is not less than 101 and not greater than 200, the air quality is determined to be light pollution and is represented by an orange identifier; in determining that the indoor environment quality comprehensive evaluation index IAQI is not less than 201 and not greater than 300, the air quality is determined to be moderate pollution and is represented by a red identifier; in determining that the indoor environment quality comprehensive evaluation index IAQI is not less than 301 and not greater than 500, the air quality is determined to be serious pollution and is represented by a purple identifier; in determining that the indoor environment quality comprehensive evaluation index IAQI is greater than 500, the air quality is determined to be severe pollution and is represented by a brown identifier.

TABLE 2

Indoor environment quality comprehensive evaluation index IAQI classification table

| Indoor Environment Quality Comprehensive Evaluation Index (IAQI) | Levels | Classification and Color Identifiers of Indoor Air Quality Index | |
| --- | --- | --- | --- |
| 0-50 | Level 1 | Optimal | Green |
| 51-100 | Level 1 | Good | Yellow |
| 101-200 | Level 2 | Light Pollution | Orange |
| 201-300 | Level 2 | Moderate Pollution | Red |
| 301-500 | Level 2 | Serious Pollution | Purple |
| >500 | Level 3 | Severe Pollution | Brown |

In this way, through adopting different color identifiers to refer to the corresponding different numerical range of the indoor environment quality comprehensive evaluation index IAQI, the current indoor environment quality condition can be known clearly through the color identifiers.

In this embodiment, in determining that the indoor environment quality comprehensive evaluation index IAQI is not greater than 100, it notifies at the user terminal, that a health classification of the indoor environment is optimal/good; in determining that the indoor environment quality comprehensive evaluation index IAQI is greater than 100, it notifies, at the user terminal, that the concentration of the indoor pollutants is exceeding the set value and/or a heat and wet factor is at a higher-level or a lower-level, according to the values detected by the indoor pollutant sensor and the temperature and humidity sensor.

In this way, through displaying the high or low values of the indoor environment quality comprehensive evaluation index IAQI at the user terminal, when the indoor environment quality comprehensive evaluation index IAQI is not greater than 100 notifying, at the user terminal that the health classification of the indoor environment is "optimal/good", and the indoor people could have peace of mind to hold indoor activities safely, when the indoor environment quality comprehensive evaluation index IAQI is greater than 100, notifying, at the user terminal that a pollutant i is exceeding the standard and(or) a heat and wet factor is at a higher-level or lower-level, according to the values detected by the indoor pollutant sensor and the temperature and humidity sensor, the indoor people could see that there is problem on the indoor environment quality, optimizing the shortage of the current warning system and device, improving the technological level of the whole air quality operation system chain, driving the development of the environment health industry, and reducing the health risk of human body and the social medical burden.

Lastly, it is to be understood that the above embodiments are merely illustrative of the technical solutions of the present disclosure and are not intended to be limiting, although it has specifically described the present disclosure by referring to some preferable embodiments, those of ordinary skill in the art should understand. Modifications or equivalent substitutions may be made to the technical solutions of the present disclosure without departing from the spirit and scope of the technical solutions of the present disclosure, all of which are intended to be encompassed by the claims of the present disclosure.

The invention claimed is:

1. A controlling method of an indoor air environment quality coordination and control system based on multiple-parameter evaluation, the indoor air environment quality coordination and control system comprising an environment data monitoring system, an indoor air environment regulation and control system and a computer system connected with an environment data monitoring system and the indoor air environment regulation and control system for data transmission; wherein the environment data detection system comprises infrared array sensors, a temperature and humidity sensor, an indoor pollutant sensor and an outdoor pollutant sensor; the infrared array sensors are configured for sensing an indoor human body and transmitting sensed value to the computer system; the temperature and humidity sensor is configured for monitoring indoor temperature and humidity and transmitting monitored values to the computer system; the indoor pollutant sensor is configured for monitoring a concentration of indoor pollutants and transmitting monitored values to the computer system; the outdoor pollutant sensor is configured for monitoring a concentration of outdoor pollutants and transmitting the monitored values to the computer system;

the indoor air environment coordination and control system comprises an air condition system configured for adjusting the indoor temperature and humidity, a purification system and a fresh air system configured for regulating the concentrations of indoor pollutants;

the computer system is configured for controlling the indoor air environment coordination and control system according to values transmitted by the environment data monitoring system;

wherein the controlling method comprises the following steps:

sensing, by the infrared array sensors, whether there is an indoor person or not;

in determining that no person indoor is sensed, turning off the air conditioner system and the purification system, and meanwhile, judging, by the computer system, the values monitored by the outdoor pollutant sensor and the indoor pollutant sensor, in determining that the value monitored by the outdoor pollutant sensor is greater than the values monitored by the indoor pollutant sensor, turning off the fresh air system, and in determining that the value monitored by the outdoor pollutant sensor is less than the value monitored by the indoor pollutant sensor, starting the fresh air system;

in determining that an indoor person is sensed, calculating, by the computer system, an indoor environment quality comprehensive evaluation index IAQI according to values transmitted by the temperature and humidity sensor and the indoor pollutant sensor;

calculating, by the computer system, a ratio R of a reduction value of an indoor environment quality comprehensive evaluation index $\Delta$IAQI and an energy consumption increase value $\Delta$P, obtained in each of a plurality of different regulation modes, and selecting among the plurality of different regulation modes, by the computer system, a regulation mode with the maximum ratio R to coordinate a quality of the indoor environment; and returning and executing the sensing step;

wherein the indoor environment quality comprehensive evaluation index IAQI is calculated according to the following formula:

$$IAQI = \Sigma_i^n IQAI_i; \; IAQI_i = \frac{IAQI_{Hi} - IAQI_{Li}}{BP_{Hi} - BP_{Li}}(C_i - BP_{Li}) + IAQI_{Li}$$

wherein, in the formula, $IAQI_i$ is an indoor environment quality sub-index of pollutant i; n is a number of pollutant items; $C_i$ is a monitored value of a concentration of pollutant i; $BP_{Hi}$ is a high-level value of a concentration limit of the pollutant i; $BP_{Li}$ is a low-level value of a concentration limit of the pollutant i; $IAQI_{Hi}$ is an indoor environment quality sub-index corresponding to $BP_{Hi}$; $IAQI_{Li}$ is an indoor environment quality sub-index corresponding to $BP_{Li}$.

2. The controlling method of claim 1, wherein, the plurality of different regulation modes comprises:

regulating and controlling the air condition system to change the indoor temperature and humidity, and operating the purification system and the fresh air system according to a single control parameter;

regulating and controlling the purification system to purify the concentrations of the indoor pollutants, operating the air condition system to meet a thermal comfort requirement, and operating the fresh air system according to the single control parameter; and regulating and controlling the fresh air system to reduce the concentrations of indoor pollutants, operating the air condition system to meet the thermal comfort requirement, and operating the purification system according to the single control parameter.

3. The controlling method of claim 2, wherein, the regulation mode of regulating and controlling the air condition system to change indoor temperature and humidity, and operating the purification system and the fresh air system according to a single control parameter is adopted, a ratio $R_1$ of a reduction value $\Delta IAQI_1$ of the indoor environment quality comprehensive evaluation index IAQI and an energy consumption increase value $\Delta P_1$ is calculated according to the following formula:

$$R_1 = \frac{\Delta IAQI_1}{\Delta P_1} = \frac{IAQI_1 - IAQI_2}{\Delta P_1}; \; \Delta P_1 = \frac{(T1 - T2)}{COP} * 100 * A;$$

in the formula, T1 is an indoor air temperature before regulation and control of the air condition system; T2 is an indoor air temperature after regulation and control of the air condition system; A is an outer wall area; COP is the energy efficiency ratio of the air conditioner; $IAQI_1$ is an indoor environment quality comprehensive evaluation index when the indoor temperature is T1; $IAQI_2$ is an indoor environment quality comprehensive evaluation index when the indoor temperature is T2.

4. The controlling method of claim 2, wherein, the regulation mode of regulating and controlling purification system to purify the concentrations of the indoor pollutants, operating the air condition system to meet the thermal comfort requirement, and operating the fresh air system according to a single control parameter is adopted, a ratio $R_2$ of a reduction value $\Delta IAQI_2$ of the indoor environment quality comprehensive evaluation index IAQI and an energy consumption increase value $\Delta P_2$ is calculated according to the following formulas:

$$R_2 = \frac{\Delta IAQI_2}{\Delta P_2} = \frac{IAQI_3 - IAQI_4}{\Delta P_2}, \Delta P_2 = P2 - P1;$$

$$C2_i = C1_i - \eta * \frac{(Q4 - Q3)}{V} * C1_i;$$

$$IAQI_3 = \Sigma_i^n IQAI_i, IAQI_i = \frac{IAQI_{Hi} - IAQI_{Li}}{BP_{Hi} - BP_{Li}}(C1_i - BP_{Li}) + IAQI_{Li};$$

$$IAQI_4 = \Sigma_i^n IQAI_i, IAQI_i = \frac{IAQI_{Hi} - IAQI_{Li}}{BP_{Hi} - BP_{Li}}(C2_i - BP_{Li}) + IAQI_{Li};$$

wherein, in the formulas, Q3 is an amount of purified air before regulation and control; Q4 is an amount of purified air after regulation and control; P1 is a power of the purification system before regulation and control; P2 is a power of the purification system after regulation and control; $C1_i$ is a concentration of a pollutant i before the regulation and control of the purification system; $C2_i$ is a concentration of a pollutant i after the regulation and control of the purification system; $\eta$ is a purification efficiency of the purification system; V is a room volume; $IAQI_3$ is an indoor environment quality comprehensive evaluation index before regulation and control of the purification system; $IAQI_4$ is an indoor environment quality comprehensive evaluation index after regulation and control of the purification system.

5. The controlling method of claim 2, wherein, the regulation mode of regulating and controlling the fresh air system to reduce the concentrations of the indoor pollutants, operating the air condition system to meet the thermal comfort requirement, and operating the purification system according to a single control parameter is adopted, a ratio $R_3$ of a reduction value $\Delta IAQI_3$ of an indoor environment quality comprehensive evaluation index IAQI and an energy consumption increase value $\Delta P_3$ is calculated according to the following formulas:

$$R_3 = \frac{\Delta IAQI_3}{\Delta P_3} = \frac{IAQI_5 - IAQI_6}{\Delta P_3}, \Delta P_3 = \frac{(T4 - T3)}{COP_2} * (Q2 - Q1);$$

$$C6_i = C5_i - \frac{(Q2 - Q1)}{V} * (C4_i - C3_i);$$

$$IAQI_5 = \Sigma_i^n IQAI_i, IAQI_i = \frac{IAQI_{Hi} - IAQI_{Li}}{BP_{Hi} - BP_{Li}}(C5_i - BP_{Li}) + IAQI_{Li};$$

$$IAQI_6 = \Sigma_i^n IQAI_i, IAQI_i = \frac{IAQI_{Hi} - IAQI_{Li}}{BP_{Hi} - BP_{Li}}(C6_i - BP_{Li}) + IAQI_{Li};$$

wherein, in the formulas, Q1 is a fresh air amount before regulation and control; Q2 is a fresh air amount after regulation and control; T3 is a temperature of an inlet of the fresh air system; T4 is a temperature of an outlet of the fresh air system; $C3_i$ is a concentration of the pollutant i of the inlet of the fresh air system; $C4_i$ is a concentration of the pollutant i of the outlet of the fresh air system; $C5_i$ is a concentration of the pollutant i before the regulation and control of the fresh air system; $C6_i$ is a concentration of the pollutant i after the regulation and control of the fresh air system; $COP_2$ is an efficiency ratio of the fresh air system; $IAQI_5$ is an indoor environment quality comprehensive evaluation index before the regulation and control of the fresh air system; $IAQI_6$ is an indoor environment quality comprehensive evaluation index after the regulation and control of the fresh air system.

6. The controlling method of claim 1, wherein, the indoor pollutant sensor comprises one or more of a formaldehyde concentration sensor, a volatile organics sensor, a PM2.5 detection sensor, and a $CO_2$ concentration sensor;
wherein, a set value of a concentration of indoor pollutants comprises: a set value of formaldehyde concentration being 0.1 mg/m$^3$, a set value of volatile organics being 0.6 mg/m$^3$, a set value of PM2.5 concentration being 75 μg/m$^3$, a set value of $CO_2$ concentration being 1000 ppm;
wherein, in determining that any of monitored values of the formaldehyde sensor, volatile organics sensor, PM2.5 detection sensor and $CO_2$ concentration sensor is greater than the corresponding set value, the concentration of the pollutants that the indoor pollutant sensor detects is determined to be greater than the set value and the purification system is started;
in determining that the temperature and humidity sensor detects that the indoor temperature is higher than 28° C., the air condition system is started;
in determining that the values monitored by the outdoor pollutant sensor is greater than the values monitored by the indoor pollutant sensor, the fresh air system is turned off, and in determining that the values monitored by the outdoor pollutant sensor is smaller than the values monitored by the indoor pollutant sensor, the fresh air system is started.

7. The controlling method of claim 1, further comprising:
in determining that the indoor environment quality comprehensive evaluation index IAQI is not less than 0 and not greater than 50, the air quality is determined to be optimal;
in determining that the indoor environment quality comprehensive evaluation index IAQI is not less than 51 and not greater than 100, the air quality is determined to be good;
in determining that the indoor environment quality comprehensive evaluation index IAQI is not less than 101 and not greater than 200, the air quality is determined to be light pollution;
in determining that the indoor environment quality comprehensive evaluation index IAQI is not less than 201 and not greater than 300, the air quality is determined to be moderate pollution;
in determining that the indoor environment quality comprehensive evaluation index IAQI is not less than 301 and not greater than 500, the air quality is determined to be serious pollution; and
in determining that the indoor environment quality comprehensive evaluation index IAQI is greater than 500, the air quality is determined to be severe pollution.

8. The controlling method of claim 1, further comprising:
in determining that the indoor environment quality comprehensive evaluation index IAQI is determined to be not greater than 100, notifying, at the user terminal, that a health classification of the indoor environment is optimal or good;
in determining that the indoor environment quality comprehensive evaluation index IAQI is greater than 100, notifying, at the user terminal, that the concentration of the indoor pollutants is exceeding the set value and/or a heat and wet factor is at a higher-level or a lower-level, according to the values detected by the indoor pollutant sensor and the temperature and humidity sensor.

* * * * *